July 3, 1956
E. W. WEITZEL
2,752,633
APPARATUS FOR SIMULTANEOUSLY ADVANCING
AND WORKING PLASTIC MATERIAL
Filed May 28, 1952
5 Sheets-Sheet 2
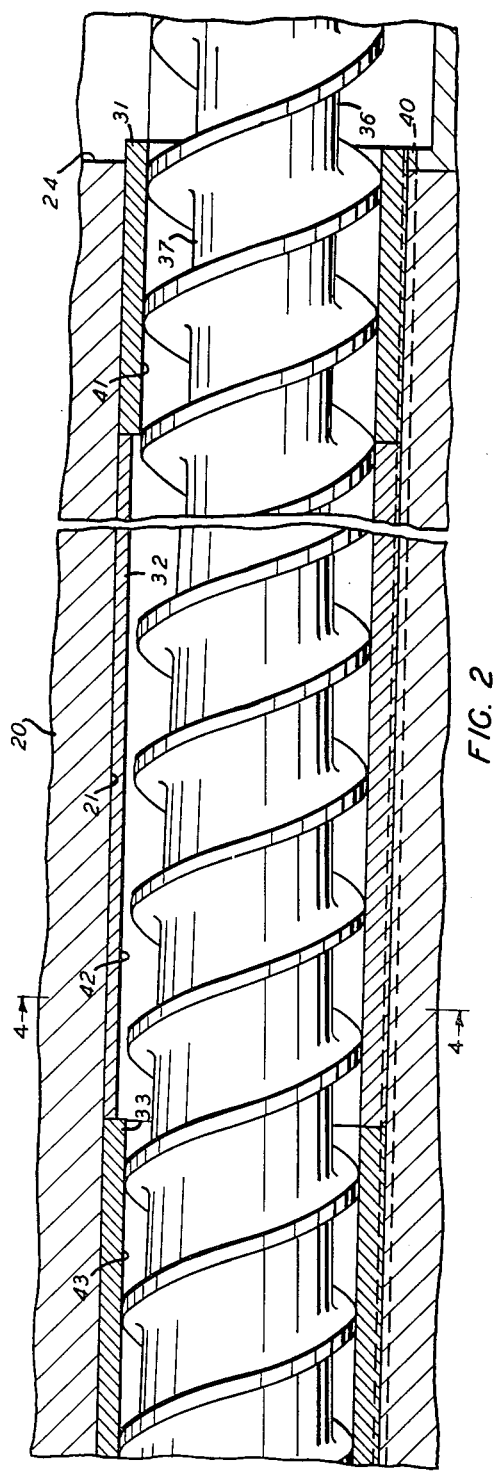
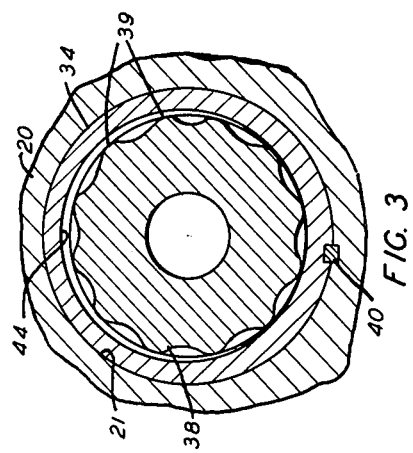
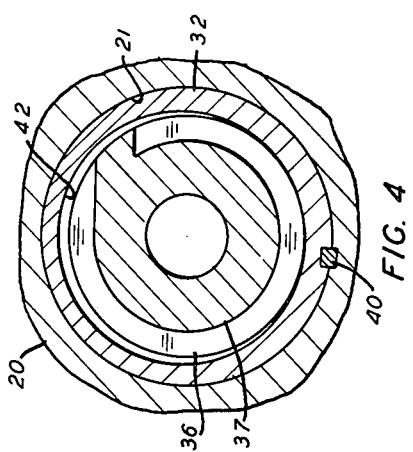
INVENTOR
E. W. WEITZEL
BY
ATTORNEY

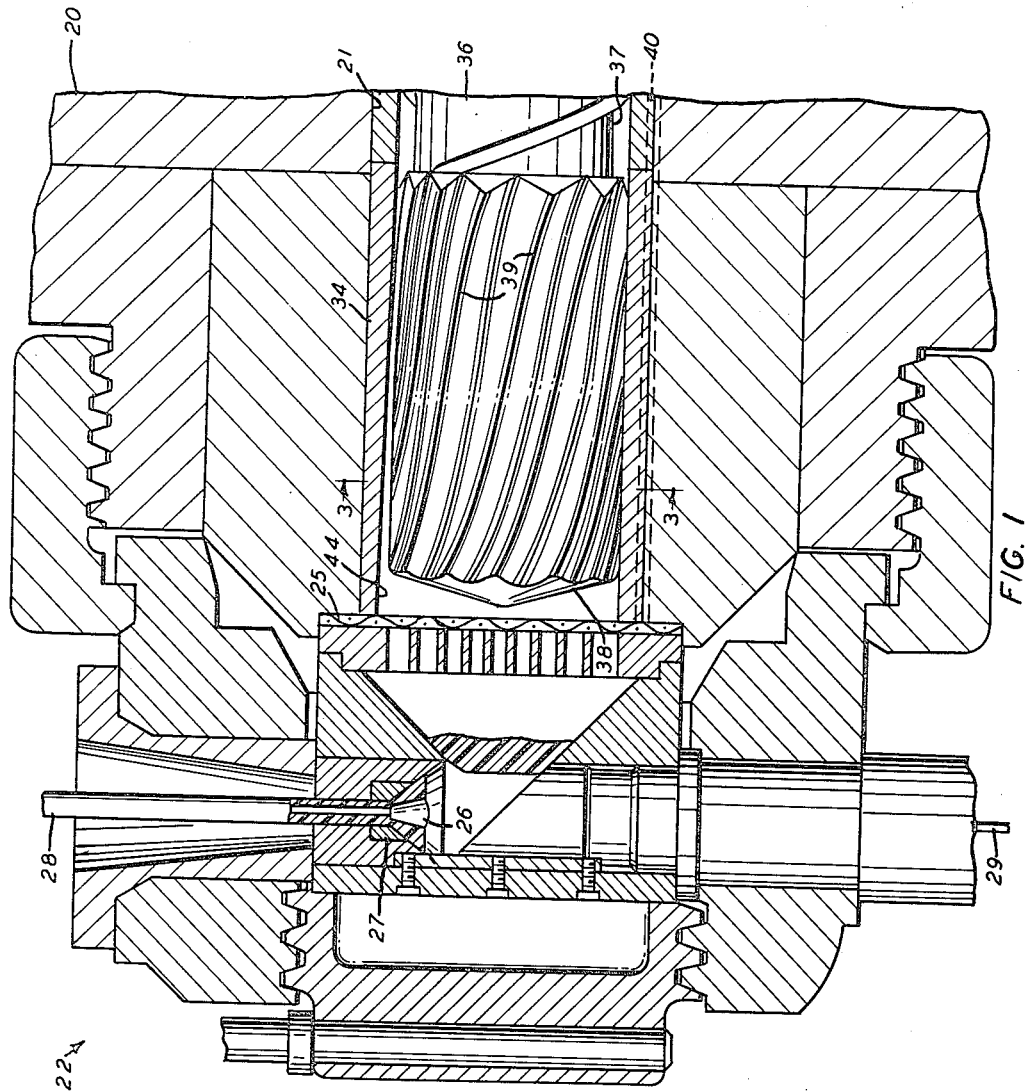

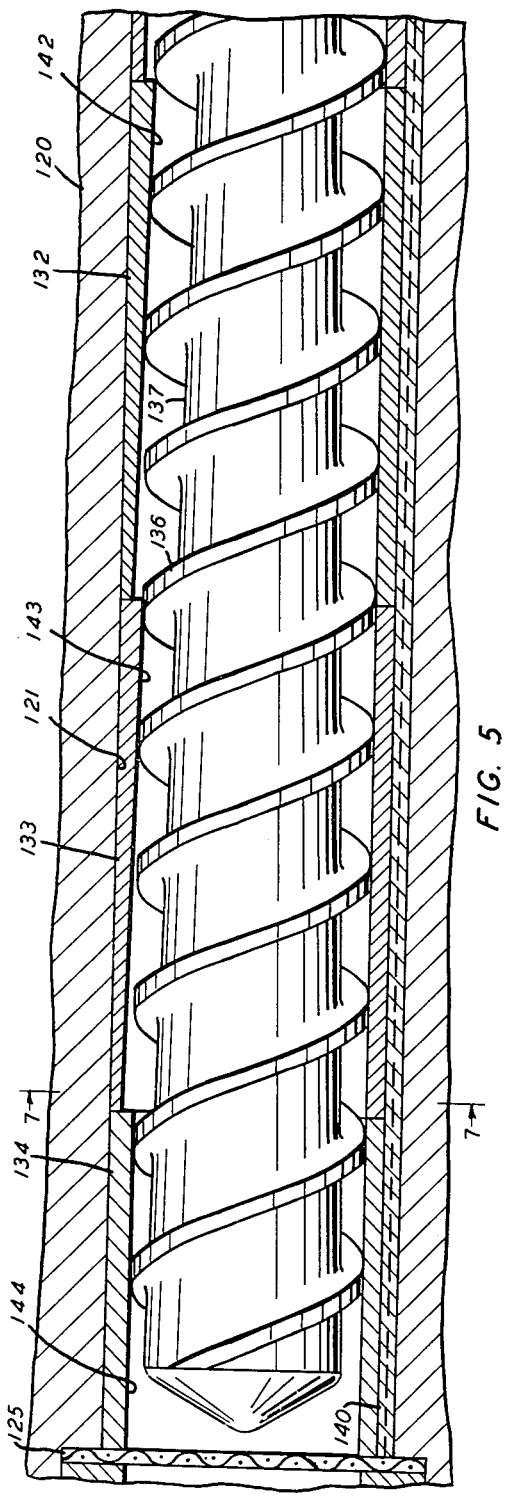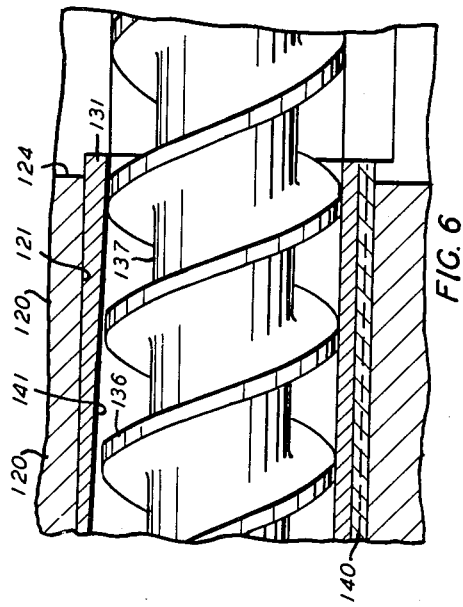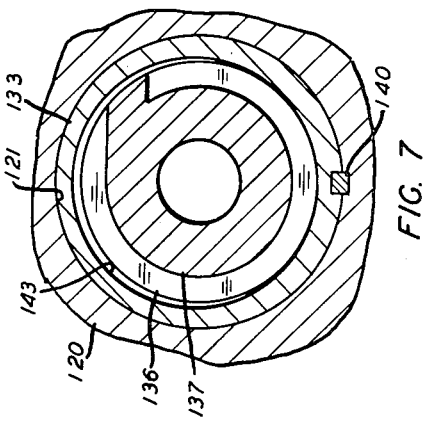

July 3, 1956

E. W. WEITZEL 2,752,633

APPARATUS FOR SIMULTANEOUSLY ADVANCING
AND WORKING PLASTIC MATERIAL

Filed May 28, 1952

INVENTOR
E. W. WEITZEL

BY *[signature]*

ATTORNEY

July 3, 1956

E. W. WEITZEL 2,752,633

APPARATUS FOR SIMULTANEOUSLY ADVANCING
AND WORKING PLASTIC MATERIAL

Filed May 28, 1952

INVENTOR
E. W. WEITZEL
BY
ATTORNEY

United States Patent Office 2,752,633
Patented July 3, 1956

2,752,633
APPARATUS FOR SIMULTANEOUSLY ADVANCING AND WORKING PLASTIC MATERIAL

Edward W. Weitzel, Hickory, N. C., assignor to Western Electric Company, Incorporated, New York, N. Y., a corporation of New York Application May 28, 1952, Serial No. 290,504

5 Claims. (Cl. 18—12)

This invention relates to apparatus for simultaneously advancing and working plastic material, and more particularly to apparatus for working plastic compounds and extruding them into coverings over conductors.

An object of the invention is to provide new and improved apparatus for simultaneously advancing and working plastic compounds.

Another object of the invention is to provide new and improved apparatus for working and extruding plastic compounds into coverings around conductors.

An apparatus illustrating certain features of the invention may include an extruding cylinder having a bore therein and a stock screw mounted rotatably in the bore, with the stock screw and bore eccentrical with respect to each other along at least a portion of their lengths, whereby plastic material inserted into the bore is subjected to a working and turbulent mixing action to raise it to a high degree of extrudability.

A complete understanding of the invention may be obtained from the following detailed description of apparatus forming specific embodiments thereof, when read in conjunction with the appended drawings, in which Fig. 1 is a horizontal section of a portion of an apparatus forming one embodiment of the invention;

Fig. 2 is a horizontal section of another portion of the apparatus shown in Fig. 1 and forming a continuation thereof;

Fig. 3 is a fragmentary, vertical section taken along line 3—3 of Fig. 1;

Fig. 4 is a fragmentary, vertical section taken along line 4—4 of Fig. 2;

Fig. 5 is a horizontal section of a portion of an apparatus forming a second embodiment of the invention;

Fig. 6 is a horizontal section of a portion of the apparatus shown in Fig. 5 and forming a continuation thereof;

Fig. 7 is a fragmentary, vertical section taken along line 7—7 of Fig. 5;

Figure 8:
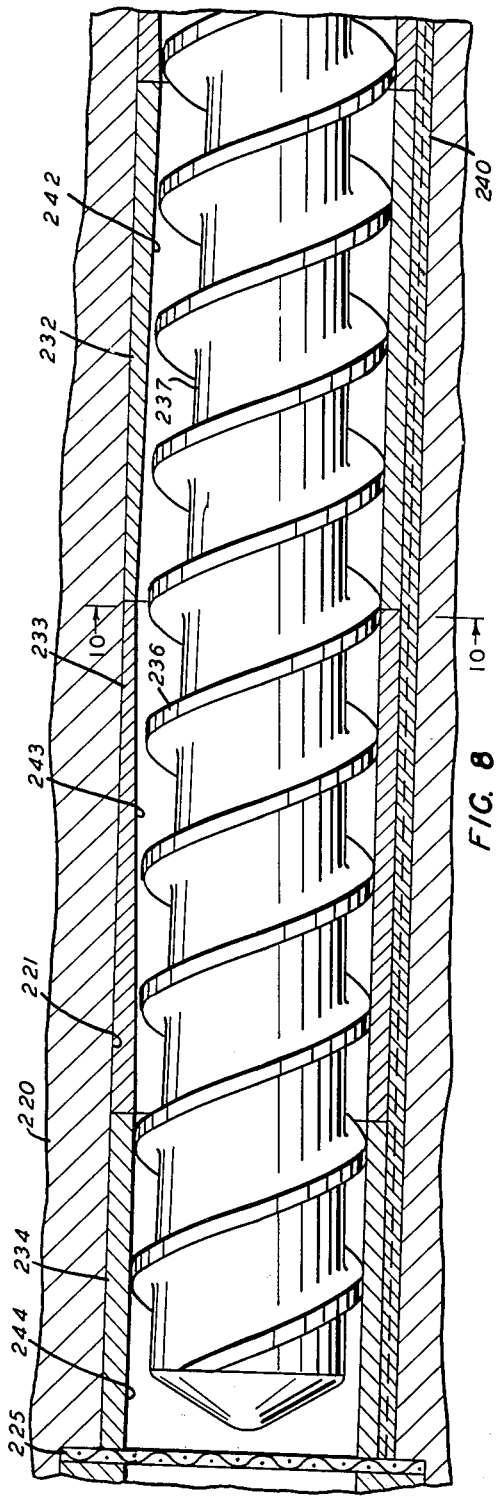
Fig. 8 is a horizontal section of a portion of an apparatus forming a third embodiment of the invention.

Referring now in detail to the drawings, there is shown in Figs. 1 to 4, inclusive, an extruder including an extruding cylinder 20, which may be heated or cooled as desired, and having a cylindrical bore 21 therein. An extruding head 22 is secured to the extruding cylinder 20. The apparatus is designed to advance, work and mix thoroughly plastic compounds, such as vulcanizable compounds or thermoplastic compounds, either in mixed or unmixed initial condition, from a feed opening 24 (Fig. 2) to and through a strainer 25 (Fig. 1). The material leaving the strainer 25 is forced past a core tube 26 through a die 27 to form a covering 28 around a conductive core 29 advanced through the core tube and the die.

Liners 31, 32, 33 and 34 are mounted in the bore 21 with their exterior surfaces concentric with and in contact with the bore 21. A stock screw 36 is mounted rotatably within the liners, and has a root 37 of continuously increasing diameter from the righthand end of the screw, as viewed in Fig. 2, the entrance end to the lefthand end thereof, the delivery end. A stock screw extension 38, provided with rounded helical ribs 39—39, is secured rigidly to the delivery end of the stock screw, and may be tapered. The liners 31, 32, 33 and 34 are held in fixed position with respect to the extruding cylinder 20 by a key 40.

The liners 31 and 33 are provided with bores 41 and 43 concentric with the exterior surfaces of the liners and concentric with the axis of rotation of the screw 36. The liners 32 and 34 are provided with bores 42 and 44, which are eccentric to the external surfaces of the liners 32 and 34, and are also eccentric to the axis of rotation of the screw 36 and the extension 38. There is substantially no clearance between the thread of the screw and the liner 32 at the bottom of the liner 32, as seen in Fig. 2. A the top of the liner 32, there is a large clearance between the screw and the liner. The eccentricity of the liner 34 with respect to the extension 38 is such that there is substantially no clearance therebetween at the bottom side of the extension as seen in Fig. 1, and there is a large clearance at the top side thereof.

Operation

A plastic compound, in either mixed or unmixed condition, is introduced into the extruding cylinder 20 through the feed opening 24 at room temperature, and the stock screw 36 is rotated in the cylinder. The stock screw feeds the compound continuously from right to left, as viewed in Figs. 1 and 2, and continuously forces it through the bore 41 in the liner 31 and into the bore 42 in the liner 32. The compound is thoroughly mixed and worked as it is advanced along the liner 32 by the stock screw. As it progresses through the liner 32, the compound slips over the upper portions of the thread with a turbulent and mixing action, and a thorough milling action is exerted upon it by the wall of the bore 42 and the lands of the threads of the stock screw.

The compound then is fed into the concentric bore 43 in the liner 33, and is fed therealong to the eccentric bore 44 in the liner 34. Within the liner 34 the stock screw extension 38 repeatedly pummels, mixes, smears and works the compound to effect a thorough mixing and breakdown thereof to bring it to a condition of very high extrudability. The compound is forced while in that condition through the die 26 which forms into the covering 28 around the conductive core 29.

Second embodiment (Figs. 5, 6 and 7)

An extruding cylinder 120 having a bore 121 formed therein mounts a stock screw 136 therein, which forces plastic compound from a feed opening 124 (Fig. 6) toward the left. From the lefthand end of the cylinder 120 the compound is forced through a strainer 125 and into an extruding head (not shown) similar to the extruding head 22, in which it is formed into a covering (not shown) over a core.

Liners 131, 132, 133 and 134 are mounted in end to end relationship in the bore 121 in the extruding cylinder 120 and are keyed against rotation relative to the cylinder by a key 140. The stock screw 136 is provided with a root 137 which varies gradually from a small diameter from the righthand end thereof, as viewed in Fig. 6, to the lefthand end thereof, as viewed in Fig. 5. Each of the liners 131, 132 and 133 tapers from a diameter substantially the same as that of the screw 136 at the righthand end thereof to a diameter substantially larger than that of the screw 136 at the lefthand end thereof. However, the liners 131, 132 and 133 are so disposed that they form a straight line on one side of the cylinder 120, that is the bottom side as seen in Figs. 5 and 6. The diameter of a bore 144 of the liner 134 is substantially the same as that of the screw 136 and serves as a bearing for the delivery end of the screw.

The bores 141, 142 and 143 are concentric with the longitudinal axis of the screw 136 at the righthand ends thereof, and are eccentric thereto at the lefthand ends thereof, so that, as seen in Figs. 5 and 6, there are large clearances at the upper portions of the bores at the lefthand ends thereof varying gradually to no clearance at the bottoms of the bores.

*Operation of second embodiment (Figs. 5, 6 and 7)*

A plastic compound is introduced into the extruding cylinder 120 through the feed opening 124, in either mixed or unmixed condition, at room temperature. The compound is fed continuously to the left, as viewed in Figs. 5 and 6, from the feed opening to and through the strainer 125 and the extruding head.

While the compound is being forced through the righthand ends of the liners 131, 132 and 133, the screw 136 exerts a high delivery action thereon. This action gradually decreases to the lefthand ends of the liners, and the mixing and working action increases from the righthand ends of the liners toward the lefthand ends thereof. Consequently, the compound is thoroughly mixed and worked with graually repeating intensity as the compound is forced through the successive liners 131, 132 and 133. Then compound is forced along the liners 134 with a high delivery action after it has been raised to a highly extrudable condition.

*Third embodiment (Figs. 8, 9 and 10)*

This extruder includes an extruding cylinder 220, which may be heated or cooled as desired, having a bore 221 therein. The cylinder has a feed opening 224 (Fig. 9), and mounts a strainer 225 (Fig. 8) at the delivery end thereof. This extruder is generally similar to the extruder described hereinabove except as pointed out hereinbelow.

Liners 231, 232, 233 and 234 are keyed in the bore 221 by a key 240. A stock screw 236 is mounted rotatably in the liners, and has a root 237 of continuously increasing diameter from the righthand end of the screw, as viewed in Fig. 9, to the lefthand end thereof, as viewed in Fig. 8. The liners 231, 232, 233 and 234 are provided with bores 241, 242, 243 and 244, respectively.

Figure 9:
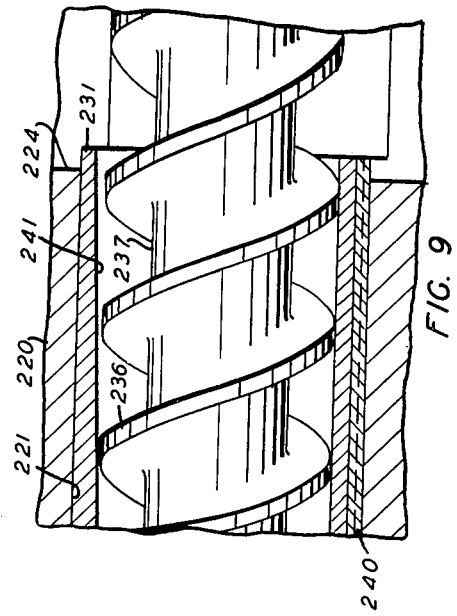
Fig. 9 is a horizontal section of a portion of the apparatus shown in Fig. 8 and forming a continuation thereof.
Figure 10:
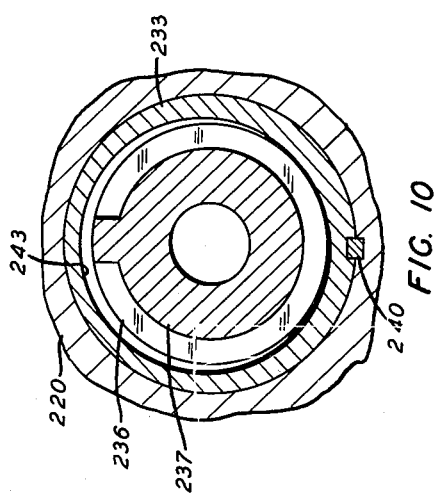
Fig. 10 is a fragmentary, vertical section taken along line 10—10 of Fig. 8.

The bores 241 and 243 are concentric with the screw 236 at the lefthand ends thereof, and are eccentric to the screw at the righthand ends thereof. The bore 241 and 242 increase gradually in eccentricity with respect to the screw as they approach the righthand ends thereof. The bore 242 is concentric with the screw 236 at the righthand end thereof and eccentric thereto at the lefthand end thereof, with the eccentricity increasing gradually along the bore 242. There is substantially no clearance between the thread of the screw 236 and the liners at the bottoms of the liners, as seen in Figs. 8 and 9, and there are large clearances between the top of the screw and the liners at the righthand ends of the liners 231 and 233, and the lefthand end of the liner 232.

*Operation of third embodiment (Figs. 8, 9 and 10)*

A plastic compound, in either mixed or unmixed condition, is introduced into the extruding cylinder 220 through the feed opening 224 at room temperature, and the stock screw 236 is rotated in the cylinder. The stock screw feeds the compound continuously from right to left, as viewed in Figs. 8 and 9, and continuously forces it along the bores 241, 242, 243 and 244. The compound is compacted and worked as it is advanced along the liner 231 by the stock screw with the compound slipping over the upper portions of the thread to some extent. These actions are repeated along the liners 232 and 233, with the intensity of the mixing and milling actions being increased gradually from the righthand end of the liner 232, as viewed in Fig. 8, to the lefthand end thereof as the eccentricity increases. The intensity of these actions decreases gradually from the righthand end of the liner 233 to the lefthand end thereof.

*Fourth embodiment (Figs. 11, 12 and 13)*

An extruding cylinder 320 is provided with a bore 321, in which a stock screw 336 is rotatably mounted. The stock screw forces plastic compound from a feed opening 324 (Fig. 12) toward the left through a strainer 325 into an extruding head (not shown) similar to the extruding head 22, and the extruding head forms the compound into a covering over a core. Liners 331 and 334 are mounted in the bore 321 in the extruding cylinder, and are keyed against rotation relative to the cylinder by a key 340. The stock screw 336 is provided with a root 337 which increases gradually from a small diameter at the righthand end of the screw 336, as viewed in Fig. 12, to a relatively large diameter at the lefthand end of the screw 336.

The liner 334 has a bore 344 concentric with respect to the longitudinal axis of the screw 336 and the bore 321. The liner 321 has a bore 341 concentric to that axis, and also is provided with a wide, shallow groove 351 extending helically around the interior thereof in the same general direction as that in which the threads of the screw extend around the screw. The groove is concave in transverse cross section, and the width and pitch thereof are such that the groove spans a plurality of lands of the screw, when viewed in a longitudinal section of the liner 331, as shown in Figs. 11 and 12.

*Operations of fourth embodiment (Figs. 11, 12 and 13)*

Figure 11:
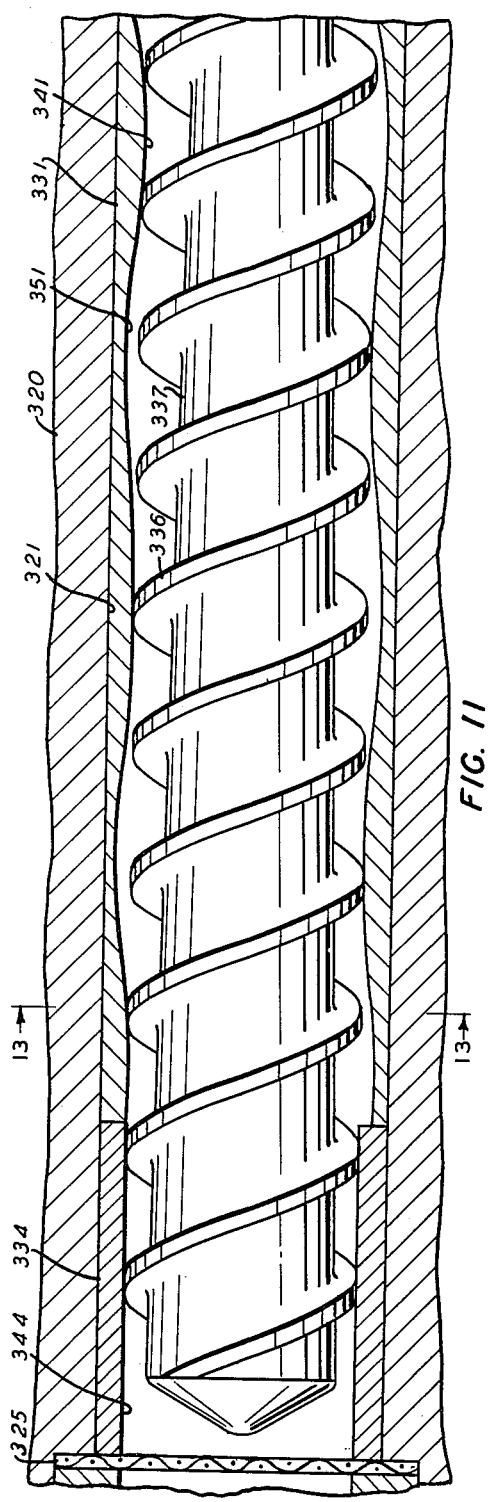
Fig. 11 is a horizontal section of a portion of an apparatus forming a fourth embodiment of the invention.
Figure 12:
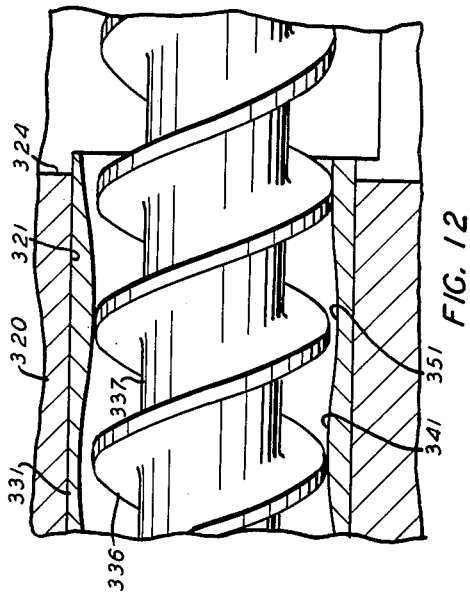
Fig. 12 is a horizontal section of a portion of the apparatus shown in Fig. 11 and forming a continuation thereof.
Figure 13:
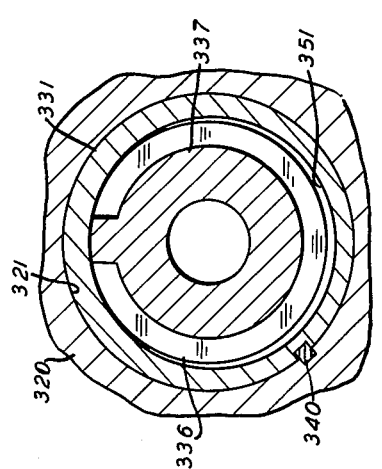
Fig. 13 is a fragmentary, vertical section taken along line 13—13 of Fig. 11.

A plastic compound is introduced into the extruding cylinder 320 through the feed opening 324, in either mixed or unmixed condition, at room temperature, and is fed continuously to the left, as viewed in Figs. 11 and 12, from the feed opening to and through the strainer 325 and the extruding head. As the compound is advanced along the liner 331, it slips over the lands of the threads of the screw 335 all along the groove 351 so that it is continuously milled and subjected to an intense, turbudent mixing action. This action works and mixes the compound to such an extent that it is highly extrudable as it reaches the liner 344 along which the screw 335 has an effective delivery action.

The pitch of the helical groove 351 may be varied to provide the desired working of the compound. Also the direction of the helical groove may be reversed, if desired, to increase the delivery of the compound and to vary the amount of working it receives.

The above-described apparatus is highly effective in workinng and mixing cold compounds to bring the extrudability thereof to a high uniform degree as the compounds are extruded into the final article shape. Conventional extruding apparatus may be converted to the apparatus disclosed herein merely by installing stock screws and liners of the types described hereinabove, which is a simple and relative inexpensive procedure.

Certain features of the above-described apparatus are disclosed and claimed in copending application Serial No. 86,086, filed April 7, 1949, by G. E. Gliss and A. N. Gray, now abandoned, and Serial No. 86,085, filed April 7, 1949, by G. E. Gliss, now abandoned, and in A. N. Gray Patent 2,547,000, granted April 3, 1951.

It is to be understood that the above-described arrangements are simply illustrative of the application of the principles of the invention. Numerous other arrangements may be readily devised by those skilled in the art which will embody the principles of the invention and fall within the spirit and scope thereof.

For example, a greater or lesser number of liners than are shown in the drawings may be used. Also, the liners may be so arranged that the areas of eccentricity occur more or less haphazardly along the extrusion screw. The liners need not necessarily be aligned so that they form a straight line on one side thereof, as shown in some of the figures of the drawings. The essential feature is that somewhere along the liners there are one or more areas of eccentricity in which plastic material being advanced through an extruder is subjected to vigorous working. This working causes a shearing action to be performed upon the plastic, and the shearing action changed in intensity because of the variations in the distances between the screw and the liner at different points along the screw.

It is to be understood that the term "compound working zone," as employed in the appended claims, is meant to designate the interior proper of the extruding cylinder, that is, the imperforate portion thereof disposed between the feed inlet end and the outlet end of the cylinder where most of the mixing and working of the plastic compound takes place.

Apparatus embodying the invention may be designed to process various kinds of plastic materials. However, it is best suited to handle plastic materials used to insulate and jacket wires and cables. Among these materials are the thermoplastic materials polyethylene, and polyvinyl resin compounds, for example polyvinyl chloride compounds. Other materials used for this purpose are vulcanizable compounds, in which the essential vulcanizable constituent is rubber, or a synthetic rubber-like material, such as neoprene or GR-S (a copolymer of butadiene and styrene sometimes designated Buna S).

What is claimed is:

1. Apparatus for simultaneously working, advancing and extruding organic plastic compounds, which comprises an elongated extruding cylinder provided with an imperforate cylindrical bore extending longitudinally therethrough and having a compound working zone intermediate its ends, a single stock screw having a helical thread thereon mounted concentrically within the bore for rotation about the longitudinal axis of the bore, and a series of unribbed tubular liners mounted in end to end relationship in the compound working portion of the bore to form a continuous passage therethrough, at least one of said liners having an interior bore extending eccentrically with respect to the stock screw to provide clearance between said liner bore and the helical thread along a substantial lengthwise portion of the compound working passage, and the other liners having interior bores extending concentrically with respect to the stock screw to provide substantially no clearance between them and the helical thread, whereby a plastic compound advancing through the compound working zone is subjected to turbulent mixing and shearing action to bring it to a high degree of extrudability.

2. Apparatus for simultaneously working, advancing and extruding organic plastic compounds, which comprises an elongated extruding cylinder provided with an imperforate cylindrical bore extending longitudinally therethrough and having a compound working zone intermediate its ends, a single stock screw having a helical thread thereon mounted concentrically within the bore for rotation about the longitudinal axis of the bore, and a series of at least three unribbed tubular liners mounted in end to end relationship in the compound working portion of the bore to form a continuous passage therethrough, said liners having interior bores extending alternately concentrically and eccentrically with respect to the stock screw to provide alternately clearance and substantially no clearance between them and the helical thread along substantial lengthwise portions of the compound working passage, whereby a plastic compound advancing through the compound working zone is subjected to turbulent mixing and shearing action to bring it to a high degree of extrudability.

3. Apparatus in accordance with claim 1, wherein the interior bore extending eccentrically with respect to the stock screw tapers longitudinally from a small diameter which provides substantially no clearance between the helical thread on the stock screw and one end of the liner bore to a larger diameter which provides substantial clearance between said thread and the opposite end of the liner bore.

4. Apparatus in accordance with claim 1, in which at least two of the series of unribbed tubular liners have interior bores extending eccentrically with respect to the stock screw along a substantial lengthwise portion of the compound working zone, each of said last mentioned interior bores tapering longitudinally from a small diameter which provides substantially no clearance between the helical thread on the stock screw and one end of the liner bore to a larger diameter which provides substantial clearance between said thread and the opposite end of the liner bore, the end of one liner bore having the small bore diameter abutting the end of the other liner having the larger bore diameter.

5. Apparatus in accordance with claim 1, wherein at least two of the series of unribbed tubular liners have interior bores extending eccentrically with respect to the stock screw along a substantial lengthwise portion of the compound working zone, each of said last mentioned interior bores tapering longitudinally from a small diameter which provides substantially no clearance between the helical thread on the stock screw and one end of the liner bore to a larger diameter which provides substantial clearance between said thread and the opposite end of the liner bore, the ends having the larger bore diameters being positioned adjacent to each other so that said clearance increases gradually up to the point at which said liners meet and then decreases gradually until there is again substantially no clearance.

References Cited in the file of this patent

UNITED STATES PATENTS

| | | |
|---|---|---|
| 1,478,842 | Staley | Dec. 25, 1923 |
| 1,904,884 | Royle | Apr. 18, 1933 |
| 2,242,364 | Montanari | May 20, 1941 |
| 2,485,854 | Zona | Oct. 25, 1949 |
| 2,556,276 | Henning | June 12, 1951 |
| 2,595,455 | Heston | May 6, 1952 |
| 2,605,531 | McElroy | Aug. 5, 1952 |
| 2,615,199 | Fuller | Oct. 28, 1952 |
| 2,620,752 | Braibanti et al. | Dec. 9, 1952 |